United States Patent
Matsuura et al.

(10) Patent No.: US 7,035,606 B2
(45) Date of Patent: Apr. 25, 2006

(54) DATA COMMUNICATION APPARATUS

(75) Inventors: Iwao Matsuura, Kanagawa (JP); Tadahisa Kamiya, Shizuoka (JP); Koji Hakamata, Shizuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 873 days.

(21) Appl. No.: 09/769,873

(22) Filed: Jan. 25, 2001

(65) Prior Publication Data

US 2001/0011027 A1 Aug. 2, 2001

(30) Foreign Application Priority Data

Jan. 31, 2000 (JP) ................................. P. 2000-021373

(51) Int. Cl.
*H04B 17/02* (2006.01)

(52) U.S. Cl. ..................................... 455/147; 455/136
(58) Field of Classification Search ................ 455/141, 455/136, 147, 196.1, 208, 209, 255, 258, 455/264, 265, 168.1, 216, 501, 502, 205, 455/67.13, 71, 62, 423; 375/346, 376; 713/501
See application file for complete search history.

(56) References Cited

U.S. PATENT DOCUMENTS

| | | | | | |
|---|---|---|---|---|---|
| 5,790,615 | A | * | 8/1998 | Beale et al. ................. | 375/376 |
| 6,198,783 | B1 | * | 3/2001 | Campana, Jr. ............... | 375/346 |
| 6,263,449 | B1 | * | 7/2001 | Motohashi ................... | 713/501 |
| 6,594,494 | B1 | * | 7/2003 | Kakehi ........................ | 455/437 |

* cited by examiner

*Primary Examiner*—Nay Maung
*Assistant Examiner*—Tu X Nguyen
(74) *Attorney, Agent, or Firm*—Pearne & Gordon LLP (57) ABSTRACT

A clock control apparatus (3) receives wireless frequency information of a wireless communication apparatus (6) from an information communication apparatus (5). Also, the clock control apparatus (3) detects an operation clock frequency of a main CPU (4). Then, when the multiplied operation clock frequency coincides with the wireless frequency, the clock control apparatus (3) lowers a voltage of the operation clock of the main CPU (4) to a minimum voltage value at which the operation of the main CPU (4) is guaranteed. Alternatively, the clock control apparatus (3) may shift the clock frequency, or may frequency-modulate the clock frequency.

19 Claims, 7 Drawing Sheets

DATA COMMUNICATION APPARATUS

BACKGROUND OF THE INVENTION

The present invention relates to a data communication apparatus for performing a data communication, while a wireless communication apparatus is connected to the data communication apparatus and a wireless line is utilized. More specifically, the present invention is directed to such a data communication apparatus operable in such a manner that a clock generated by the data communication apparatus gives no disturbance to the wireless communication apparatus.

Recently, since mobile communication terminals such as portable telephones are popularized and notebook type personal computers are made more compact and in lighter weight, data communications such as electronic mails and the Internet are frequently carried out by employing wireless communication lines, while wireless communication apparatuses such as portable telephones are connected to data communication apparatuses such as notebook type personal computers. Furthermore, these electronic appliances will be made more compact and in hybrid forms.

Figure 9:
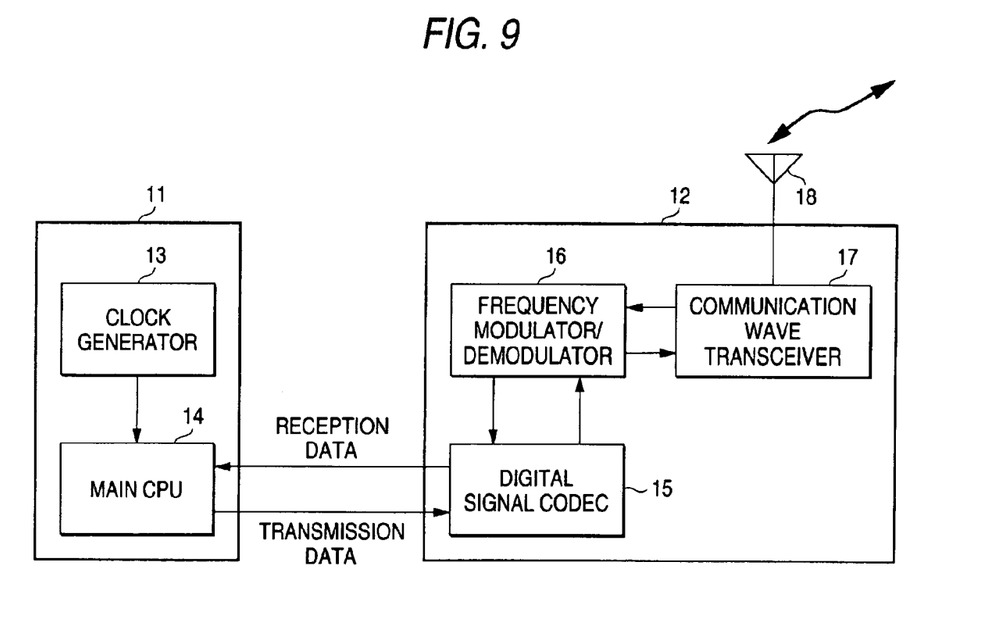
FIG. 9 is a diagram for indicating the arrangement of the conventional data communication apparatus and the wireless communication apparatus.

FIG. 9 schematically shows a system for executing a wireless data communication, while a wireless communication apparatus 12 is connected to the conventional data communication apparatus 11 by employing a cable, or the like.

The data communication apparatus 11 is provided with a clock generating apparatus 13 and a main CPU 14. The wireless communication apparatus 12 is provided with digital signal codec 15, frequency modulator/demodulator 16, a communication wave transceiver 17, and an antenna 18.

The clock generating apparatus 13 is constructed of an oscillator circuit by using a crystal oscillator, or electric resonance. The clock generating apparatus 13 generates an operation clock used to operate the main CPU 14. The main CPU 14 is operated at timing of the operation clock supplied from the clock generating apparatus 13. Then, the main CPU 14 outputs the transmission data to the digital signal codec 15 of the wireless communication apparatus 12, and receives the reception data from the digital signal codec 15.

The digital signal codec 15 performs a signal process operation with respect to the transmission data so as to produce a baseband signal, and supplies this baseband signal to the frequency modulator/demodulator 16. In this signal process operation, the error correction code is applied to the transmission data and the transmission data is encrypted. Also, the digital signal codec 15 performs such a process operation as a decrypting operation and an error detection/correction with respect to a baseband signal of reception data outputted from the frequency modulator/demodulator 16. The frequency modulator/demodulator 16 modulates a high frequency signal for the wireless communication based upon the baseband signal of the transmission data, and then outputs the modulated high frequency signal to the communication wave transceiver 17. Also, the frequency modulator/demodulator 16 demodulates a baseband signal from the reception signal outputted from the communication wave transceiver 17 to derive such a baseband signal, and then outputs the demodulated baseband signal to the digital signal codec 15. The communication wave transceiver 17 up-converts and amplifies the modulated high frequency signal for transmission, and then supplies the resulting high frequency signal to an antenna 18. Also, the communication wave transceiver 17 amplifies an electromagnetic wave received by the antenna 18, and down-converts the frequency of the amplified signal, and then outputs the down-converted signal to the frequency modulator/demodulator 16.

In the system arranged with employment of the above-described circuit arrangement, when data is transmitted, the main CPU 14 provided in the data communication apparatus 11 executes a data process operation with respect to this transmission data, and then transmits the data-processed transmission data to the wireless communication apparatus 12. In this data process operation, the main CPU 14 divides the transmission data and adds header/footer to the transmission data in accordance with such a data communication protocol such as TCP/IP. The digital signal codec 15 employed in the wireless communication apparatus 12 executes a signal process operation with respect to the data sent from the data communication apparatus 11 so as to produce a baseband signal. Then, the digital signal codec 15 transmits the produced baseband signal to the frequency modulator/demodulator 16. In this signal process operation, the digital signal codec 15 applies an error correction code to the sent data and encrypts the sent data. Then, the frequency modulator/demodulator 16 modulates a high frequency signal for a wireless communication by using the baseband signal, and the communication wave transceiver 17 up-converts the frequency of the modulated high frequency signal and amplifies the up-converted high frequency signal. Then, this communication wave transceiver 17 radiates the amplified high frequency signal from the antenna 18 to the air space.

When data is received, the system is operated in a manner opposite to the above-explained transmission manner. That is, a baseband signal is derived from an electromagnetic wave received by the antenna 18 by way of the communication wave transceiver 17 and the frequency modulator/demodulator 16. The baseband signal is processed by the digital signal codec 15 by executing the decrypting operation, the error detecting operation, and the error correction operation. As a result, such a signal which has been processed in accordance with the data communication protocol such as TCP/IP is outputted. Then, this resulting signal is transmitted via a cable, a connector, and the like to the data communication apparatus 11. The main CPU 14 of the data communication apparatus 11 removes the header and the footer, which are applied in accordance with the TCP/IP protocol, and combines the removed data with each other to reproduce the reception data.

The data communication apparatus contains the clock generating apparatus, such as an oscillator circuit using the crystal oscillator or the electric resonance, in order to operate the CPU. From such a clock generating apparatus, harmonic content having such frequencies higher than the desirable frequency of the clock by 2 times, 3 times, 4 times, - - - , are derived in addition to the clock having the desirable frequency. These harmonic content are referred to as "multiplied wave noise", and are radiated as disturbance waves (interference waves) from the data communication apparatus to the air space.

The multiplied wave noise generated from the clock generating apparatus provided inside the data communication apparatus is propagated through the air space, and may give disturbances, or interference to electronic appliances such as televisions and radios located around this data communication apparatus. In particular, as to such a data communication apparatus operated in the mode that a portable telephone is connected to this data communication apparatus so as to execute a wireless data communication, the wireless communication apparatus such as the portable telephone is positioned in the vicinity of the data communication apparatus, or is manufactured in an integral form with this data communication apparatus. As a result, the wireless communication apparatus easily receives the disturbance waves caused by the multiplied wave noise. Unfortunately, in such a case that the multiplied wave noise is made coincident with the wireless communication frequency, this may give adverse influences to the wireless communications, for instance, the reception sensitivity would be deteriorated, the data error rate would be deteriorated, and the data communication speed would be lowered.

Figure 10:
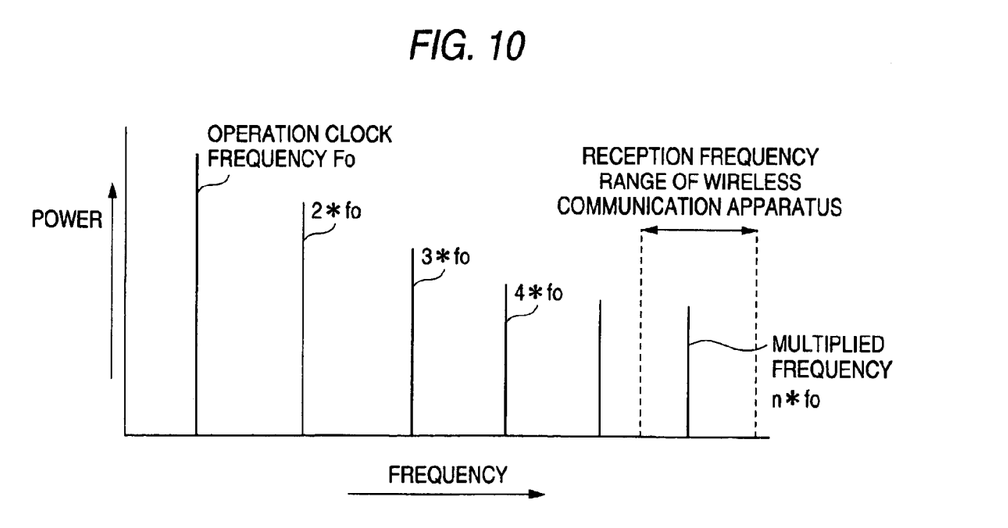
FIG. 10 is a diagram for representing the multiplied frequency characteristic of the disturbance waves radiated from the conventional data communication apparatus.

FIG. 10 graphically represents a characteristic in which higher order waves (namely, harmonic content multiplied by "n") of multiplied wave noise give an adverse influence to a reception frequency range of a wireless communication apparatus.

To solve this problem, since the clock generating apparatus is covered by employing a metal case so as to be electrically shielded, the radiated multiplexed wave noise is reduced. Also, since the spatial distance between the data communication apparatus and the wireless communication apparatus is separated from each other by employing the cable, the adverse influence caused by the multiplexed wave noise can be hardly received. However, the shield case may disturb the light weight of the data communication apparatus. Also, if the conventional method for separating the distances among the apparatuses by employing the cables, then the design policy for making the respective apparatuses compact has no meaning.

SUMMARY OF THE INVENTION

The present invention has been made to solve the above-described problems of the conventional art, and therefore, has an object to provide a compact data communication apparatus manufactured in light weight, capable of achieving a high-speed data communication, without giving a disturbance to the data communication.

A data communication apparatus, according to the present invention, is featured by such a data communication apparatus connected to a wireless communication apparatus, for executing a data communication by using a wireless line, comprising:

information communication means for communicating with the wireless communication apparatus; clock generating means; and clock control means; wherein: the clock control means controls the clock generating means in response to operation condition information of the wireless communication apparatus, which is received by the information communication means, in such a manner that a multiplied frequency of a clock generated by the clock generating means gives no disturbance to the operation of the wireless communication apparatus. With employment of such an arrangement, the multiplied wave noise of the clock never gives disturbances to the wireless frequency of the wireless communication apparatus. As a result, the high-speed wireless data communications can be carried out under stable condition without data errors. Furthermore, since the metallic shield case capable of preventing radiations of multiplied wave noise is no longer required, the data communication apparatus can be further made compact and in light weight, and also can be further manufactured in low cost.

DETAILED DESCRIPTION OF THE PREFERRED EMBODIMENTS

Referring now to drawings, embodiments of the present invention will be described in detail.

Figure 1:
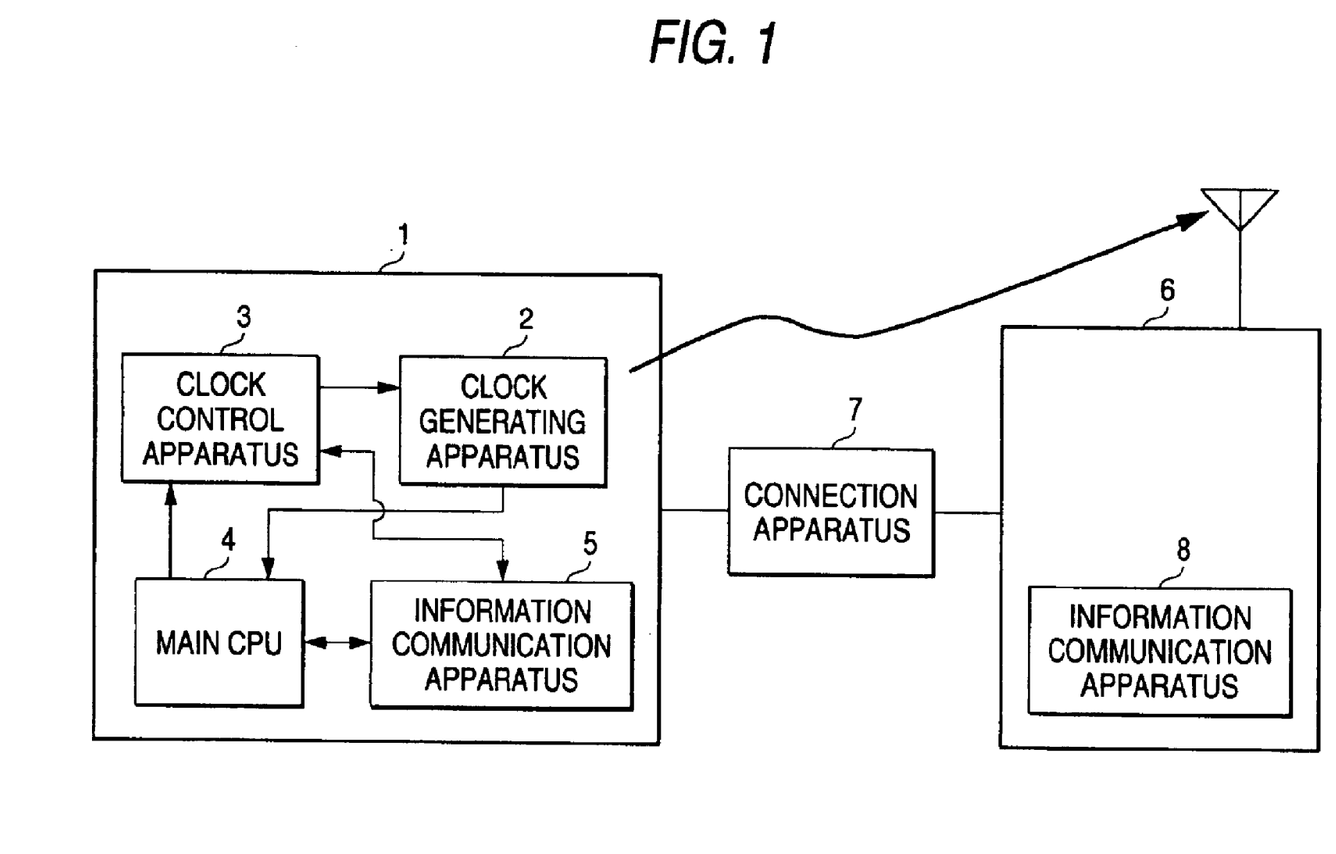
FIG. 1 is a diagram for showing a system in which a wireless communication apparatus is connected to a data communication apparatus according to an embodiment mode of the present invention so as to perform a wireless data communication.

FIG. 1 schematically indicates a system in which a wireless communication apparatus is connected to a data communication apparatus according to an embodiment of the present invention so as to carry out a wireless data communication.

This system is arranged by that a data communication apparatus 1 is connected to a wireless communication apparatus 6 by employing a connection apparatus 7.

Similar to the conventional data communication apparatus 11, the data communication apparatus 1 is provided with a clock generating apparatus 2 and a main CPU 4. Furthermore, this data communication apparatus 1 is equipped with a clock control apparatus 3 and an information communication apparatus 5. Although not shown in the drawing, the wireless communication apparatus 6 is provided with digital signal codec, frequency modulator/demodulator, communication wave transceiver, and an antenna, similar to the conventional wireless communication apparatus 12. Furthermore, the wireless communication apparatus 6 is equipped with an information communication apparatus 8. While the data communication apparatus 1 and the wireless communication apparatus 6 are connected to each other by using the connection apparatus 7, transmission/reception data, and operation condition information of both the data communication apparatus 1 and the wireless communication apparatus 6 are mutually transmitted/received by the information communication apparatuses 5 and 8, respectively.

The clock generating apparatus 2 comprises an oscillator circuit by using a crystal oscillator, or electric resonance. The clock generating apparatus 2 generates an operation clock used to operate the main CPU 4. The main CPU 4 is operated at timing of operation clock supplied from the clock generating apparatus 2. Then, the main CPU 4 outputs the transmission data to the information communication apparatus 5 and receives reception data from the information communication apparatus 5. The clock control apparatus 3 controls the clock generating apparatus 2 based upon the operation clock of the main CPU 4 and operation condition information (will be discussed more in detail) of the wireless communication apparatus 6 supplied from the information communication apparatus 5. The clock control apparatus 3 detects the frequency of the operation clock of the main CPU 4.

In the system with employment of the above-described arrangement, the transmission data produced by the main CPU 4 is sent to the information communication apparatus 8 of the wireless communication apparatus 6 via both the information communication apparatus 5 and the connection apparatus 7. Then, this transmission data is radiated from the antenna through the digital signal codec, the frequency modulator/demodulator, and the communication wave transceiver, which are not shown, to the air space. When data is received, the system is operated in a manner opposite to the above-described data transmission operation. That is, reception data is entered from electromagnetic waves received by the antenna via the communication wave transceiver, the frequency modulator/demodulator, and the digital signal codec into the information communication apparatus 8. Then, this reception data is entered to the main CPU 4 via the connection apparatus 7 and the information communication apparatus 5.

Also, in the system shown in FIG. 1, various sorts of operation condition information (wireless frequency, reception data error rate, electric field strength, communication line quality information, and so on) of the wireless communication apparatus 6 is sent from the information communication apparatus 8 to the information communication apparatus 5. The information communication apparatus 5 sends the received operation condition to the clock control apparatus 3. Based upon both the received operation condition information and the operation clock frequency of the clock generating apparatus 2, the clock control apparatus 3 controls the operation clock of the clock generating apparatus 2 (namely, controls voltage, frequency shift, frequency modulation, or more than two items thereof combined with each other) so that the multiplied frequency of the operation clock generated from the clock generating apparatus 2 gives no disturbance (interference) to the operation of the wireless communication apparatus 6.

Now, operations of the clock control apparatus 3 will be explained concretely.

First Operation Example

Figure 2:
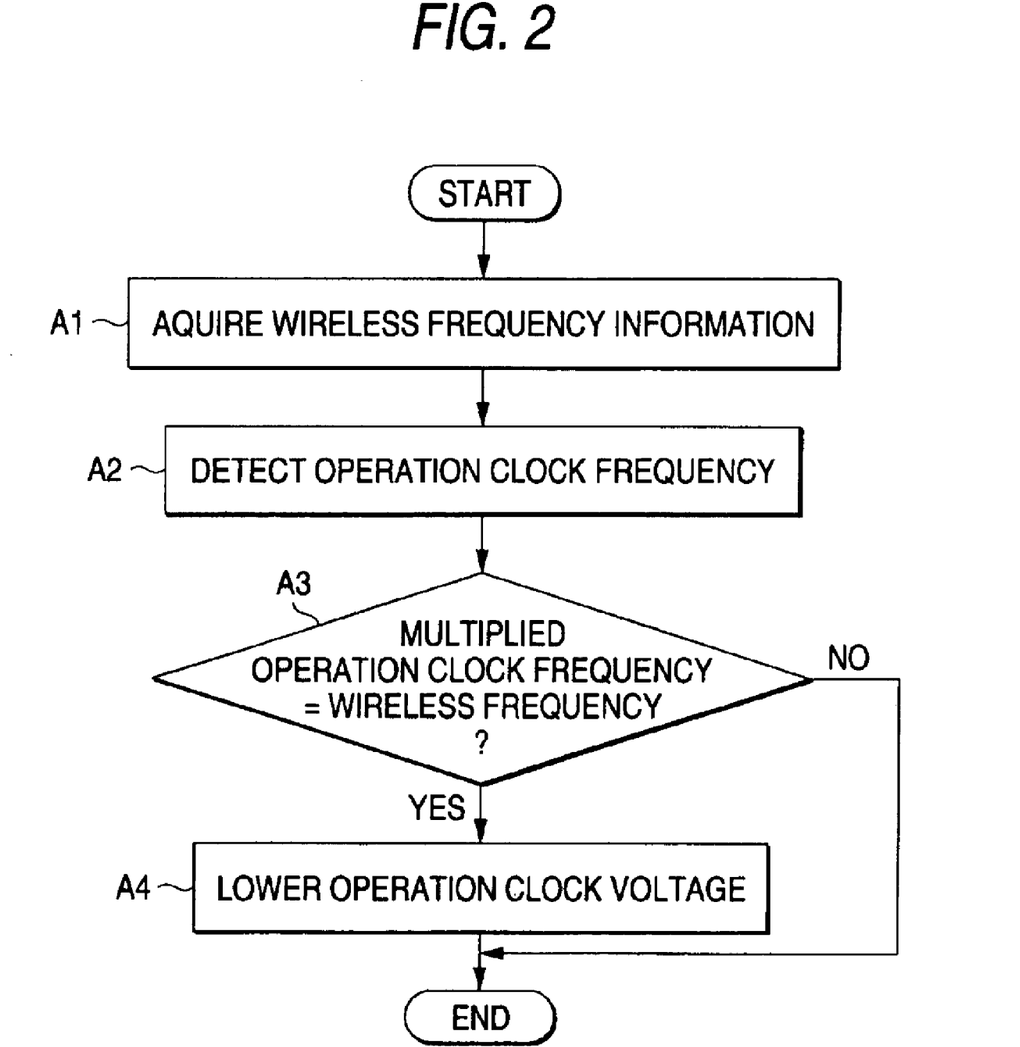
FIG. 2 is a flow chart for describing a first operation example of a clock control apparatus employed in the data communication apparatus according to the embodiment mode of the present invention.

FIG. 2 is a flow chart for describing a first operation example of the clock control apparatus 3. First, the clock control apparatus 3 receives wireless frequency information of the wireless communication apparatus 6 from the information communication apparatus 5 (step A1). Next, the clock control apparatus 3 detects an operation clock frequency of the main CPU 4, namely a frequency of an operation clock supplied by the clock generating apparatus 2 to the main CPU 4 (step A2). The clock control apparatus 3 judges as to whether or not the multiplied operation clock frequency coincides with the wireless frequency. When the multiplied operation clock frequency coincides with the wireless frequency ("YES" at step A3), the clock control apparatus 3 lowers the voltage of the operation clock of the main CPU 4 to a minimum voltage value at which the operation of the main CPU 4 is guaranteed (step A4). To the contrary, when the multiplied operation frequency does not coincide with the wireless frequency, the clock control apparatus 3 does not execute the clock control operation, but accomplishes a series of this clock control operation.

Second Operation Example

Figure 3:
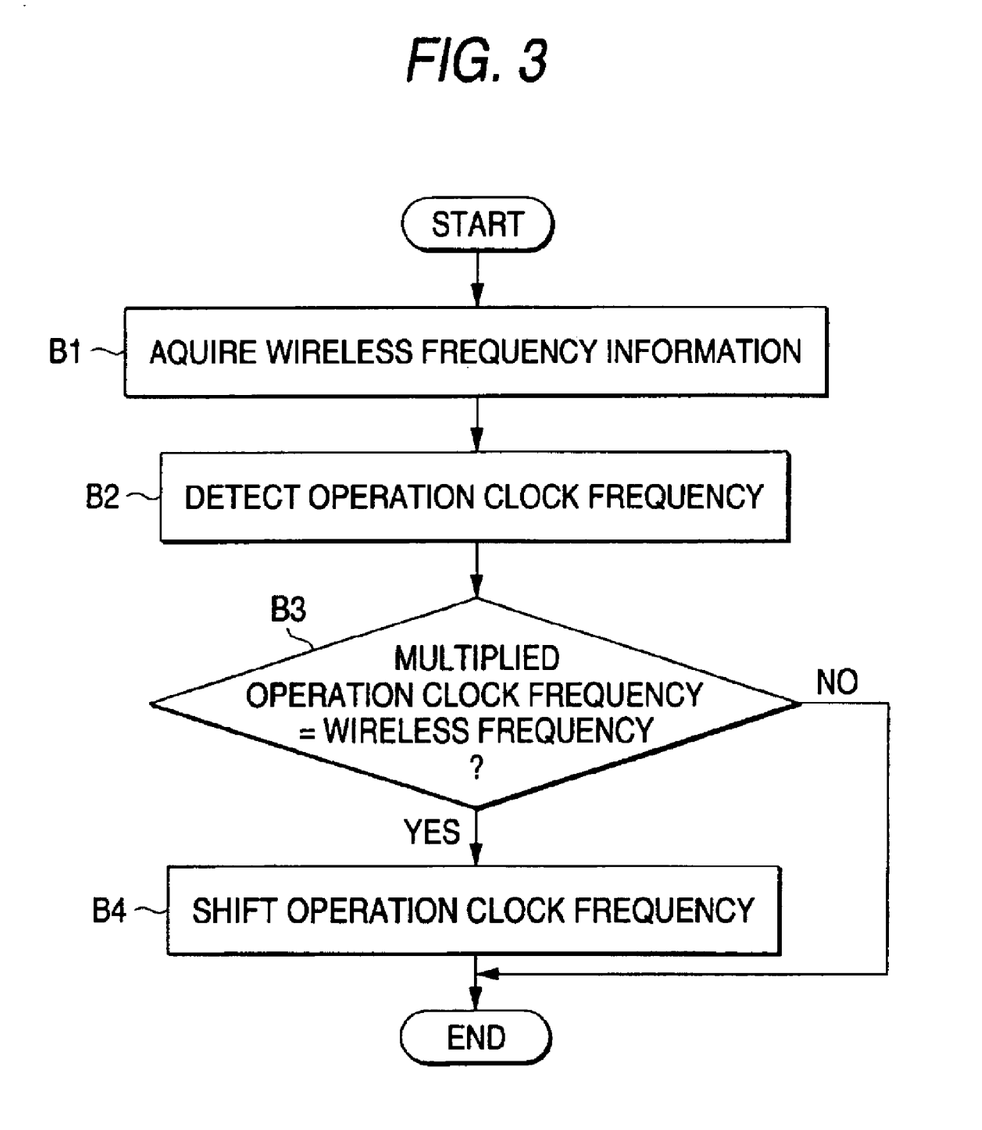
FIG. 3 is a flow chart for describing a second operation example of the clock control apparatus employed in the data communication apparatus according to the embodiment mode of the present invention.

FIG. 3 is a flow chart for explaining a second operation example of the clock control apparatus 3. It should be understood that steps B1 to B3 defined in this flow chart are identical to the steps A1 to A3 defined in the flow chart of FIG. 2, respectively. In this second operation example, in such a case that the multiplied operation clock frequency of the main CPU 4 coincides with the wireless frequency ("YES" at step B3), the clock control apparatus 3 shifts the frequency of the operation clock of the main CPU 4 to either a minimum frequency or a maximum frequency at which the operation of the main CPU 4 is guaranteed (step B4). When the operation clock frequency does not coincide with the wireless frequency, the clock control apparatus 3 does not execute the clock control operation, but accomplishes a series of this clock control operation.

Third Operation Example

Figure 4:
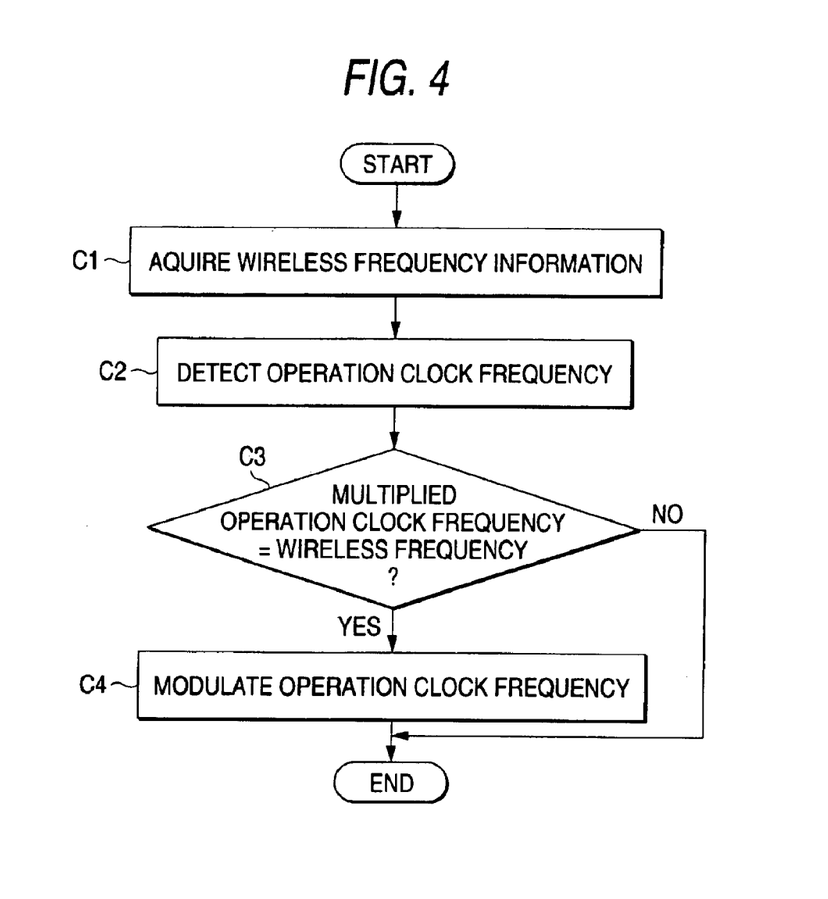
FIG. 4 is a flow chart for describing a third operation example of the clock control apparatus employed in the data communication apparatus according to the embodiment mode of the present invention.

FIG. 4 is a flow chart for explaining a third operation example of the clock control apparatus 3. It should be understood that steps C1 to C3 defined in this flow chart are identical to the steps A1 to A3 defined in the flow chart of FIG. 2, respectively. In this third operation example, in such a case that the multiplied operation clock frequency of the main CPU 4 coincides with the wireless frequency ("YES" at step C3), the clock control apparatus 3 frequency-modulates the operation clock of the main CPU 4 so that the modulation degree does not exceed a frequency range at which the operation of the main CPU 4 is guaranteed (step C4). When the operation clock frequency does not coincide with the wireless frequency, the clock control apparatus 3 does not execute the clock control operation, but accomplishes a series of this clock control operation.

Figure 5:
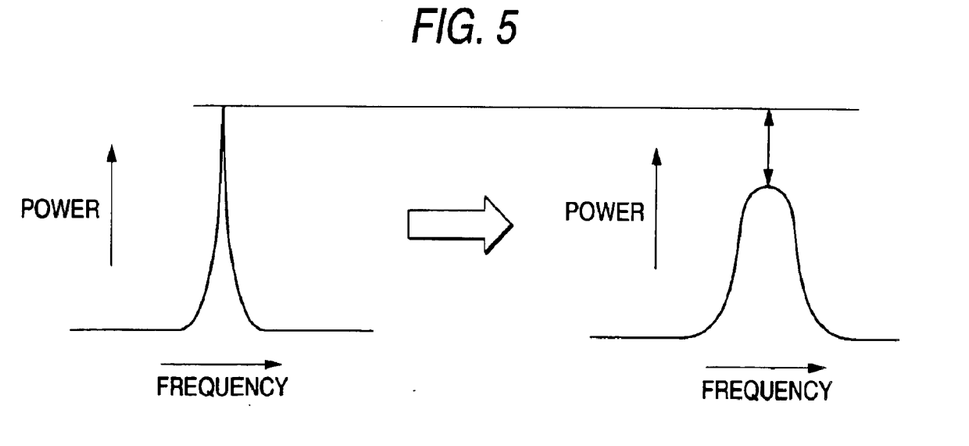
FIG. 5 is a diagram for representing a frequency characteristic of disturbance waves caused by multiplied waves of an operation clock of a main CPU 4 in the operation example of FIG. 4.

FIG. 5 indicates a frequency characteristic of a disturbance wave which is caused by the operation clock of the main CPU 4 in this third operation example. Since the operation clock of the main CPU 4 is frequency-modulated, the disturbance wave is also frequency-modulated. As a result, it can be seen that the frequency characteristic of the disturbance wave is broadened, and at the same time, the electric field strength is lowered.

Fourth Operation Example

Figure 6:
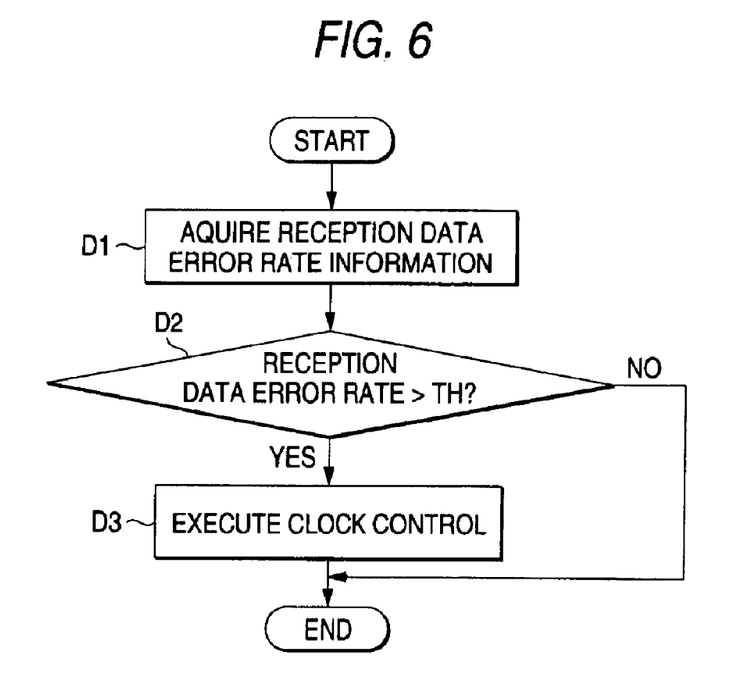
FIG. 6 is a flow chart for describing a fourth operation example of the clock control apparatus employed in the data communication apparatus according to the embodiment mode of the present invention.

FIG. 6 is a flow chart for explaining a fourth operation example of the clock control apparatus 3. First, the clock control apparatus 3 receives reception data error rate information of the wireless communication apparatus 6 from the information communication apparatus 5 (step D1). Next, the clock control apparatus 3 judges as to whether or not this error rate exceeds a predetermined threshold value "TH"

(step D2). When this error rate exceeds the threshold value TH ("YES" at step D2), the clock controls apparatus 3 performs the clock control operation (step D3). In such a case that the reception data error rate is smaller than, or equal to the threshold value "TH" ("NO" at step D2), the clock control apparatus 3 does not execute the clock control operation.

In this case, the contents of the clock control operation by the clock control apparatus 3 are given as follows: the clock voltage is lowered, the clock frequency is shifted, the clock signal is frequency-modulated, and more than two items thereof are combined with each other (namely, voltage lowering and frequency shift, frequency shift and frequency modulation, and further, voltage lowering, frequency shift, and frequency modulation are combined with each other, respectively).

Fifth Operation Example

Figure 7:
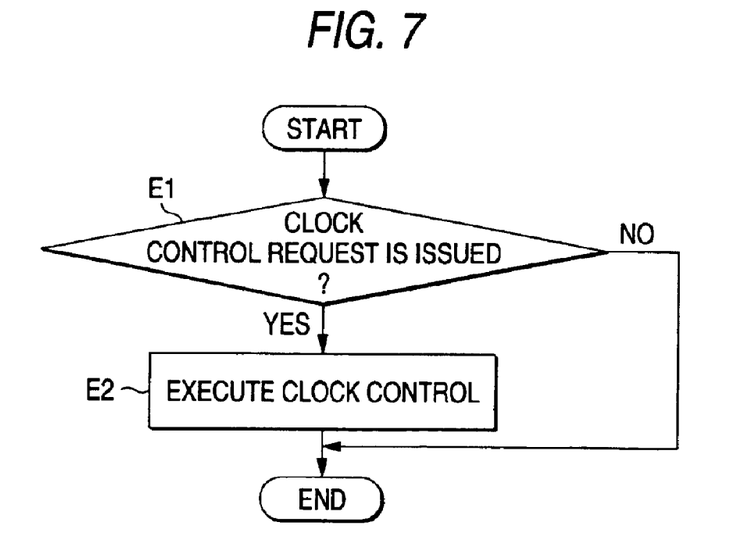
FIG. 7 is a flow chart for describing a fifth operation example of the clock control apparatus employed in the data communication apparatus according to the embodiment mode of the present invention.

FIG. 7 is a flow chart for explaining a fifth operation example of the clock control apparatus 3. The clock control apparatus 3 judges as to whether or not the information communication apparatus 5 receives a clock control request from the information communication apparatus 8 of the wireless communication apparatus 6 (step E1). Then, when the information communication apparatus 5 receives the clock control request ("YES" at step E1), the clock control apparatus 3 executes the clock control operation (step E2). To the contrary, when the information communication apparatus 5 does not receive the clock control request ("NO" at step E1), the clock control apparatus 3 does not perform the clock control operation. The content of the clock control operation is the same as that of the fourth operation example.

Sixth Operation Example

Figure 8:
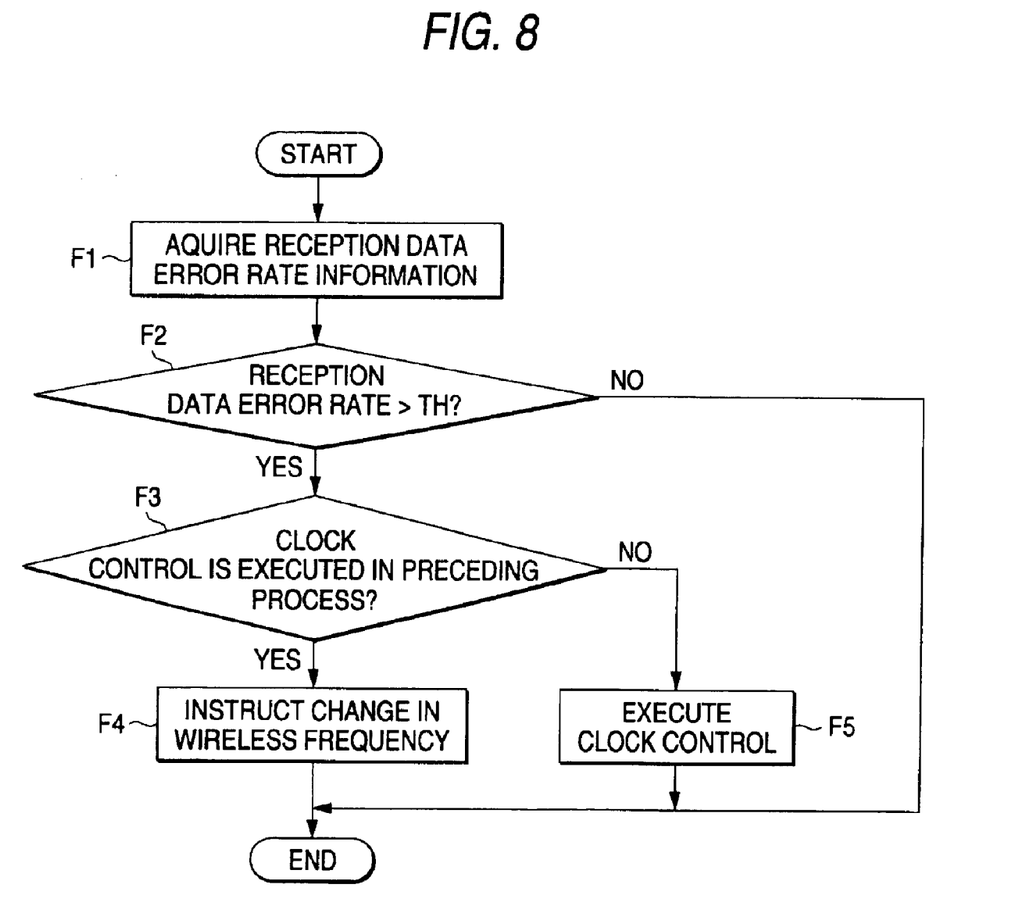
FIG. 8 is a flow chart for describing a sixth operation example of the clock control apparatus employed in the data communication apparatus according to the embodiment mode of the present invention.

FIG. 8 is a flow-chart for explaining a sixth operation example of the clock control apparatus 3. It should be understood that steps F1 to F2 defined in this flow chart are identical to the steps D1 to D2 defined in the flow chart of FIG. 6, respectively. In this sixth operation example, when a reception data error rate of the wireless communication apparatus 6 exceeds a predetermined threshold value "TH" ("YES" at step F2), the clock control apparatus 3 judges as to whether or not the clock control operation has been carried out in the preceding process operation (step F3). Then, when the clock control apparatus 3 judges that the clock control operation has been carried out in the preceding process operation ("YES" at step F3), the clock control apparatus 3 transmits a wireless frequency change instruction to the wireless communication apparatus 6 (step F4). To the contrary, when the clock control apparatus 3 judges that the clock control operation has not yet been carried out in the preceding process operation ("NO" at step F3), the clock control apparatus 3 executes the clock control operation (step F5). When the reception data error rate is smaller than, or equal to the threshold value "TH" ("NO" at step F2), the clock control apparatus 3 does not execute the clock control operation.

It should also be noted that the wireless communication apparatus 6 may be attached to the data communication apparatus 1, or may be built in this data communication apparatus 1 in FIG. 1. Since the data communication apparatus is arranged in the above-explained circuit arrangement, it is possible to realize such a compact/low-cost data communication apparatus operable in a high speed, while this data communication apparatus utilizes the wireless line without such data errors. Also the data communication apparatus according to the present invention may be constituted to perform the below-mentioned operations (1) to (9) other than the above-explained operation examples exemplified in the above embodiment.

(1) The wireless frequency information of the wireless communication apparatus 6 is received by the information communication apparatus 5 at the time of starting the data communication, and in the case that the clock control apparatus judges that this wireless frequency coincides with the multiplied frequency of the operation clock of the main CPU 4, the clock control apparatus executes the clock control operation.

(2) The wireless frequency information of the wireless communication apparatus 6 is periodically received by the information communication apparatus 5 in a predetermined interval, and in the case that the clock control apparatus judges that this wireless frequency coincides with the multiplied frequency of the operation clock of the main CPU 4, the clock control apparatus executes the clock control operation.

(3) The wireless frequency information of the wireless communication apparatus 6 is received by the information communication apparatus 5, and also, this received wireless frequency is changed from the wireless frequency information detected in the preceding process operation, and furthermore, when the clock control apparatus judges that this wireless frequency is made coincident with the multiplied frequency of the operation clock of the main CPU 4, the clock control apparatus executes the clock control operation.

(4) Both the reception data error rate information and the received electric field strength information of the wireless communication apparatus 6 are received by the information communication apparatus 5, and the clock control apparatus judges as to whether or not the operation clock control is carried out based on two sorts of the above-described information, and adjusts the frequency shift amount and the modulation degree.

(5) The reception data error rate information of the wireless communication apparatus 6 is received by the information communication apparatus 5, and when the clock control apparatus judges that this error rate exceeds the error correction capability of the wireless communication apparatus 6, the clock control apparatus executes the clock control operation.

(6) The reception electric field strength of the wireless communication apparatus 6 is received by the information communication apparatus 5, and when the clock control apparatus judges that this received field strength becomes lower than such a level that the error starts to appear in the reception data, the clock control apparatus executes the clock control operation.

(7) The reception data error rate information of the wireless communication apparatus 6 is received by the information communication apparatus 5, and when the clock control apparatus judges that the data error happens to occur, the clock control apparatus executes the clock control operation.

(8) The reception data error rate information, the electric field strength information, and the line quality information of the wireless communication apparatus 6 are received by the information communication apparatus 5, the clock control apparatus judges as to whether or not the clock control operation is carried out based upon three sorts of the above information.

(9) The clock control apparatus 3 notifies a wireless frequency information which may be supposed to be disturbed by the operation clock of the main CPU 4, to the wireless communication apparatus 6 via the information communication apparatus 5.

As previously described, in accordance with the present invention, since the multiplied wave frequency of the operation clock of the main CPU employed in the data communication apparatus does not give the disturbances to the wireless frequency range of the wireless communication apparatus, it is possible to realize such a data communication apparatus with less data errors and also having the high data transfer speed, while using the wireless line. Also since the metallic shield case capable of preventing the radiation of the multiplied wave noise is no longer required, the data communication apparatus can be made compact, in low cost, and also in light weight.

What is claimed is:

1. A data communication apparatus connected to a wireless communication apparatus for executing a data communication via a wireless line, comprising:

an information communicator which communicates with the wireless communication aparatus and receives operation condition information of the wireless communication apparatus;

a clock generator which generates a clock; and a clock controller for performing a clock control operation to control the clock generator in response to the operation condition information, wherein the clock control operation is at least one of a voltage control and a frequency control;

wherein the operation condition information includes a reception data error rate of the wireless communication apparatus.

2. A data communication apparatus according to claim 1, wherein the frequency control is a frequency shift.

3. A data communication apparatus according to claim 1, wherein the frequency control is a frequency modulation.

4. A data communication apparatus according to claim 1, wherein the operation condition information includes information of a wireless frequency used by the wireless communication apparatus.

5. A data communication apparatus according to claim 1, wherein the operation condition information includes a reception filed strength of the wireless communication apparatus.

6. A data communication apparatus according to claim 1, wherein the operation condition information includes line quality information of the wireless communication apparatus.

7. A data communication apparatus according to claim 4, wherein the information communicator receives information of the wireless frequency when data communication operation is commenced.

8. A data communication apparatus according to claim 4, wherein the information communicator periodically receives information of the wireless frequency in a predetermined time interval.

9. A data communication apparatus according to ciaim 4, wherein the clock controller performs the clock control operation when the clock controller judges that a multiplied frequency of the clock coincide with the wireless frequency.

10. A data communication apparatus according to claim 4, wherein the clock controller performs the clock control operation when the clock controller judges that the wireless frequency is changed from the preceding frequency value.

11. A data communication apparatus according to claim 1, wherein the clock controller performs the clock control operation when the clock controller judges that the reception data error rate exceeds an error correction capability of the wireless communication apparatus.

12. A data communication apparatus according to claim 5, wherein the clock controller performs the clock control operation when the clock controller judges that the reception filed strength becomes lower than a level at which a data error starts to occur.

13. A data communication apparatus according to claim 1, wherein the clock controller performs the clock control operation when the clock controller judges that a reception data error occurs in the wireless communication apparatus based upon the reception data error rate.

14. A data communication apparatus according to claim 1, wherein the wireless communication apparatus outputs a signal for requesting the clock control operation to the clock controller and when the clock controller receives the clock control request signal, the clock controller performs the clock control operation.

15. A data communication apparatus according to claim 1, wherein the clock controller outputs an instruction to change the wireless frequency of the wireless communication apparatus when the clock controller judges that there is no disturbance reducing effect for the wireless communication apparatus even after the clock control operation has been carried out.

16. A data communication apparatus according to claim 1, wherein the clock controller notifies wireless frequency information which may be disturbed by the clock to the wireless communication apparatus.

17. A data communication apparatus according to claim 1, wherein said a clock controller for performs said clock control operation so that a multiplied frequency of the clock gives no disturbance to the operation of the wireless communication apparatus.

18. A data communication apparatus connected to a wireless communication apparatus for executing a data communication via a wireless line, comprising:

an information communicator which communicates with the wireless communication apparatus and receives operation condition information of the wireless communication apparatus;

a clock generator which generates a clock; and a clock controller for performing a clock control operation to control the clock generator in response to the operation condition information, wherein the operation condition information includes information of a received wireless frequency used by the wireless communication apparatus, and wherein the clock control operation is conducted when the received wireless frequency is judged to be an integer-multiplied value of an operation clock frequency.

19. A data communication apparatus connected to a wireless communication apparatus for executing a data communication via a wireless line, comprising:

an information communicator which communicates with the wireless communication apparatus and receives operation condition information of the wireless communication apparatus;

a clock generator which generates a clock; and a clock controller for performing a clock control operation to control the clock generator in response to the operation condition information, wherein the operation condition information includes a reception data error rate of the wireless communication apparatus, and wherein the clock control operation is conducted when the reception data error rate of the wireless communication apparatus is judged to exceed a predetermined threshold value.

* * * * *